United States Patent
Otto

(10) Patent No.: US 6,578,760 B1
(45) Date of Patent: Jun. 17, 2003

(54) CHECK CASHING AT AUTOMATED TELLER MACHINES

(75) Inventor: Jerome A. Otto, Centerville, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/329,102

(22) Filed: Jun. 9, 1999

(51) Int. Cl.[7] .............................................. G06F 17/60
(52) U.S. Cl. ...................... 235/379; 235/380; 235/382; 902/8
(58) Field of Search ................................. 235/379, 380; 705/42, 45; 340/825.33, 825.34; 902/8, 14, 30

(56) References Cited

U.S. PATENT DOCUMENTS

| | | | | |
|---|---|---|---|---|
| 3,705,384 A | | 12/1972 | Wahlberg | ................... 235/381 |
| 4,109,238 A | * | 8/1978 | Creekmore | ................... 235/379 |
| 4,617,457 A | | 10/1986 | Granzow et al. | ........... 235/379 |
| 5,592,377 A | * | 1/1997 | Lipkin | .......................... 705/42 |
| 5,663,546 A | * | 9/1997 | Cucinotta et al. | ........... 235/379 |
| 5,890,141 A | * | 3/1999 | Carney et al. | ................. 705/45 |
| 5,897,625 A | * | 4/1999 | Gustin et al. | ................ 235/379 |
| 6,038,553 A | * | 3/2000 | Hyde, Jr. | ..................... 235/379 |
| 6,129,273 A | * | 10/2000 | Shah | ........................... 235/375 |
| 6,212,504 B1 | * | 4/2001 | Hayosh | ........................ 705/64 |

* cited by examiner

*Primary Examiner*—Michael G. Lee
*Assistant Examiner*—Ahshik Kim
(74) *Attorney, Agent, or Firm*—Gregory A. Welte

(57) ABSTRACT

A self-service kiosk for cashing checks. A kiosk, such as an Automated Teller Machine (ATM) receives a bank check from a customer. After identifying the customer and verifying the check, the kiosk delivers currency to the customer, and retains the check. However, the kiosk does not cause a deduction in an account maintained by the customer, because the check was probably drawn on the account of another.

2 Claims, 3 Drawing Sheets

CHECK CASHING AT AUTOMATED TELLER MACHINES

The invention concerns an automated teller machine which cashes so-called "second-party checks." The machine delivers currency to the person cashing the check, but, in general, makes no deduction from an account maintained by the person. The reason is that the check is written by another party, and drawn on that party's account.

BACKGROUND OF THE INVENTION

For various reasons, numerous people do not maintain bank accounts. The reasons may include (1) a distrust of banks, (2) a preference for dealing exclusively in cash, and (3) an infrequent need for a bank account. It may seem odd that the last factor, infrequent need, would promote avoidance of a bank account. However, many banks impose penalties on people who maintain small accounts or who write checks infrequently. These charges discourage maintenance of the accounts.

Even though these people lack accounts, they must still cash checks, such as payroll checks and government checks, including social security checks and welfare checks. It would seem that these checks could be cashed at a bank, but this does not often occur, for two primary reasons.

The first is distance: the bank on which a check is drawn will cash the check, and may even be required by law to do so. However, visiting the drawee-bank often requires travelling a long distance.

The second reason is that banks other than the drawee-bank, in general, will only cash checks for persons maintaining accounts at those banks. However, as stated above, the people under consideration do not maintain bank accounts.

Therefore, for at least these two reasons, people lacking bank accounts tend to avoid cashing checks at banks.

To accommodate these people, check-cashing "stores" have developed. These stores are sometimes called "currency exchanges." While these stores provide the service of cashing checks, they tend to impose high fees upon the check-cashing transaction.

OBJECTS OF THE INVENTION

An object of the invention is to utilize an Automated Teller Machine (ATM) to cash checks.

A further object of the invention is to provide an improved ATM machine.

SUMMARY OF THE INVENTION

In one form of the invention, an ATM accepts a check from a person, and delivers cash, but without modifying an account maintained by the person.

DETAILED DESCRIPTION OF THE INVENTION

Figure 1:
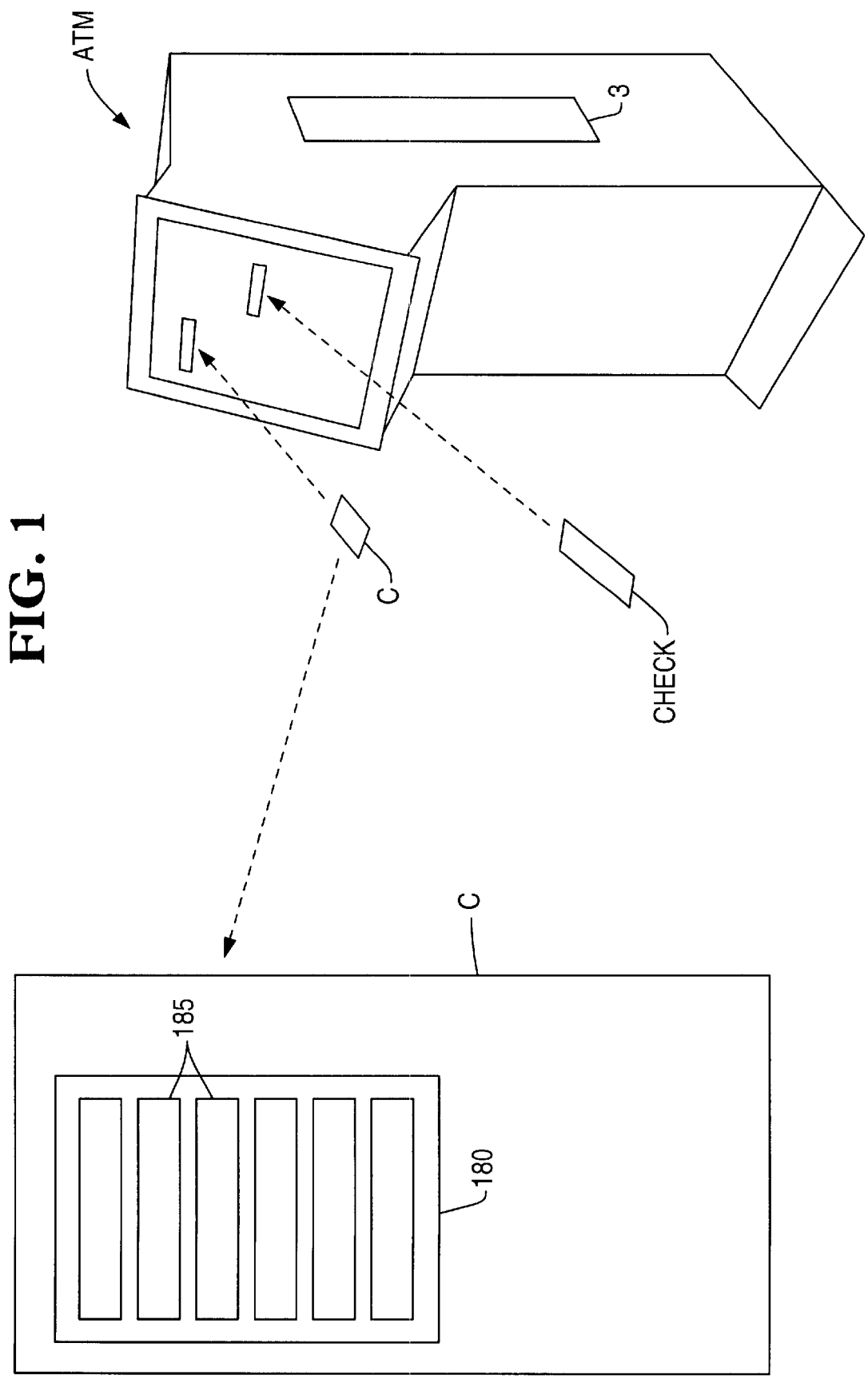
FIG. 1 illustrates one form of the invention.
Figure 2:
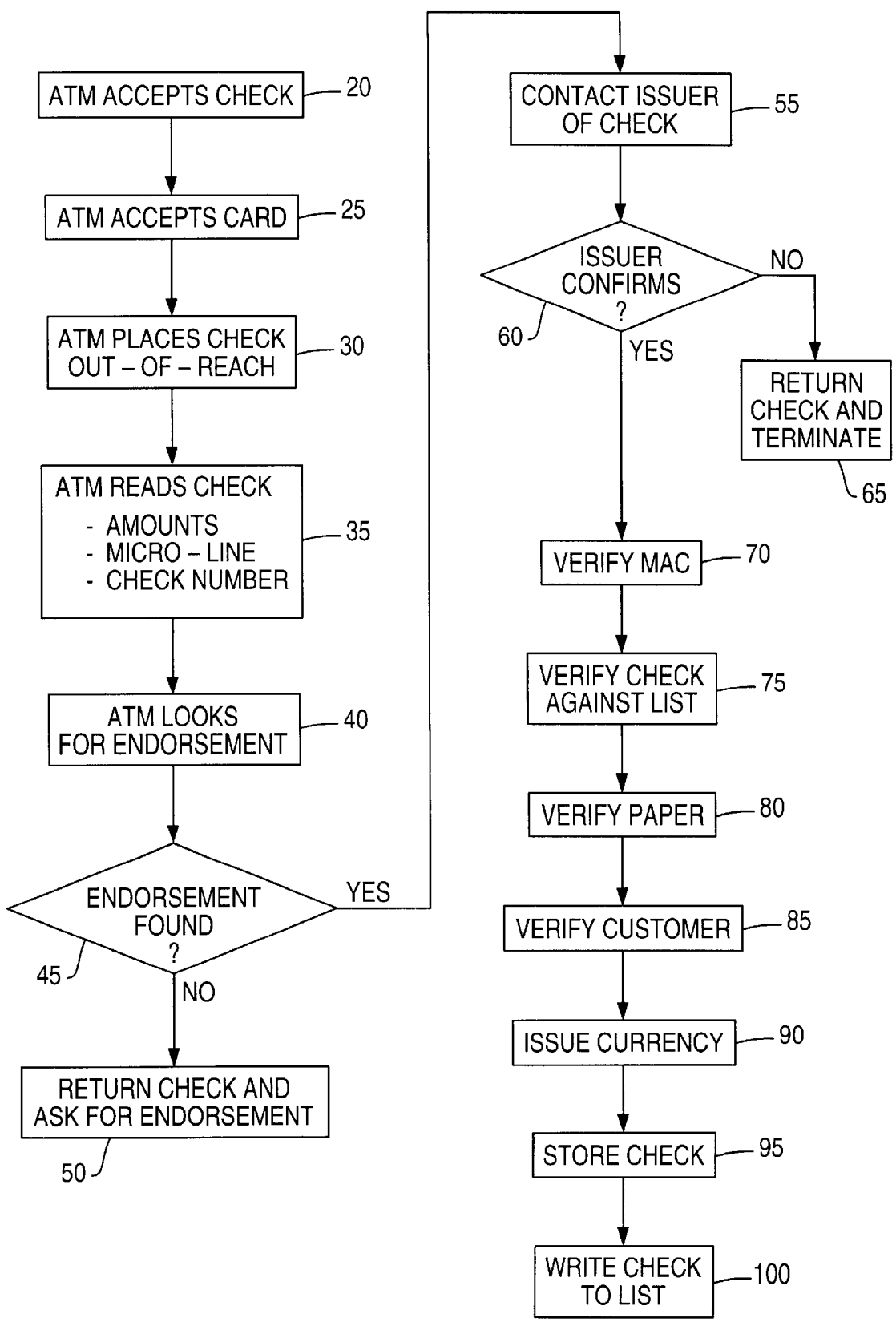
FIG. 2 is a flow chart illustrating logic implemented by one form of the invention.

FIG. 1 illustrates an Automated Teller Machine, ATM. Such machines are commercially available. Block 3 within the machine represents apparatus and software which implement the functions which the invention adds to the ATM. FIG. 2 is a flow chart illustrating procedures utilized by one form of the invention.

The procedures seek to accomplish two primary objectives: one is to verify that the check is authentic. To be authentic, as a minimum, the check must not be a forgery. For example, a copy of an authentic check would be a forgery. The second objective is to verify that the person cashing the check is named as the payee on the check.

In FIG. 2, block 20 indicates that the ATM accepts a check, indicated as CHECK in FIG. 1, and block 25 in FIG. 2 indicates that the ATM accepts a card C in FIG. 1. The card C may be a smart card, described below, or may be an ordinary ATM-card, used in the ordinary log-in procedure.

Block 30 in FIG. 2 indicates that the invention places the check out-of-reach of the customer. Mechanical devices for performing the actions of blocks 20, 25, and 30 are known in the art. The check is placed out-of-reach so that a dishonest customer cannot take currency which will be later dispensed, and also retain the check.

Figure 3:
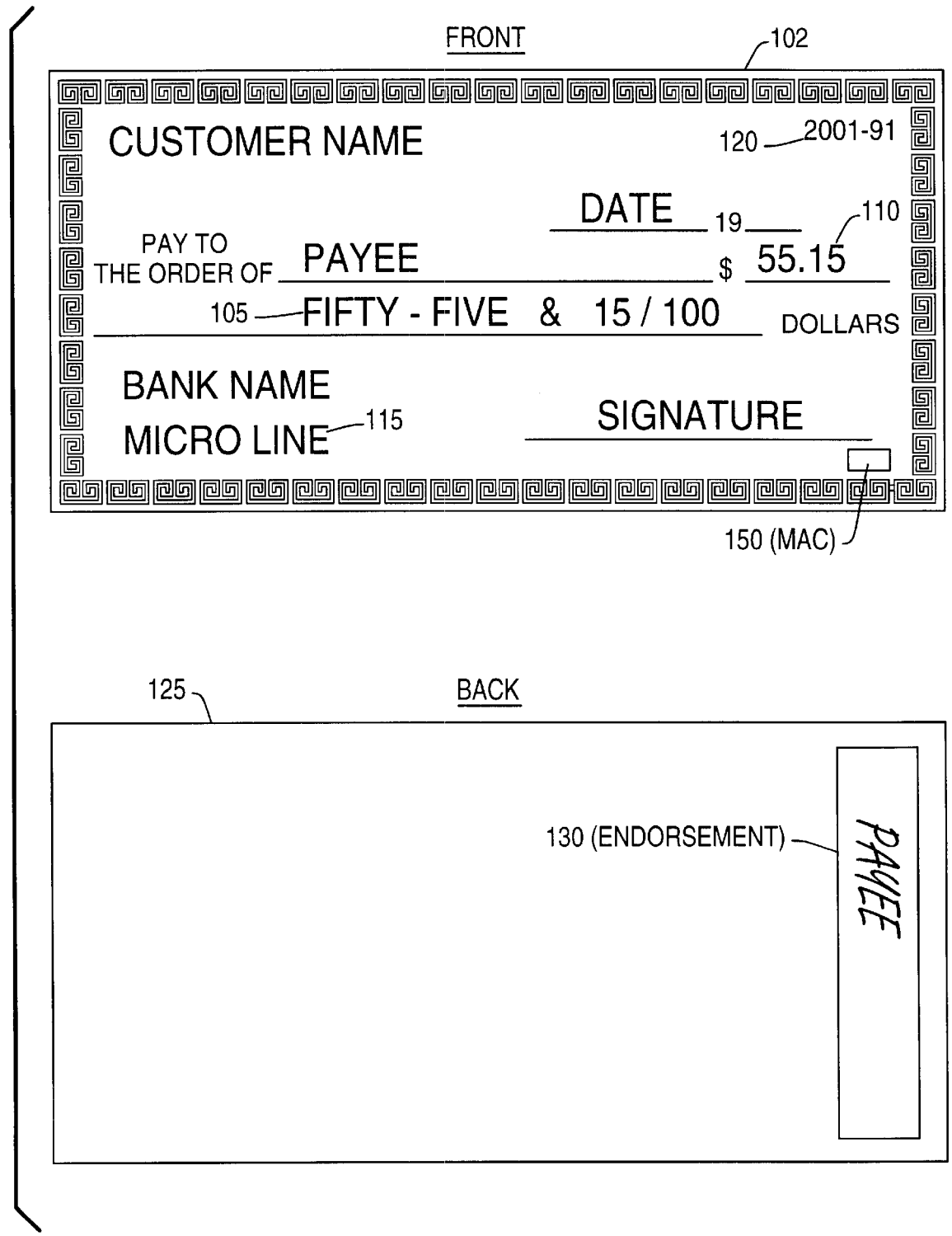
FIG. 3 illustrates a bank check.

Block 35 indicates that the invention reads the check. FIG. 3 illustrates an exemplary check 102. The reading operation of block 35 in FIG. 2 includes one, or more, of the following steps: (1) reading one or more monetary amounts, such as the "legal amount" 105 or the "courtesy amount" 110, or both, (2) reading the number in the "micro-line" 115 which identifies the bank issuing the check, and (3) reading the check number 120.

In addition, as indicated by optional block 40, the invention may examine the back 125 of the check, in search of an endorsement 130 by the person cashing the check. It is emphasized that the endorsement is not necessarily "read," as by a character-recognition process. That is, if "Jack Jones" is the named payee, the invention does not necessarily ascertain whether the endorsement 130 reads "Jack Jones," although that could be done. Rather, the invention looks for the existence of a handwritten, printed, or typed endorsement.

If no endorsement is found, the NO branch of block 45 is taken, and, as block 50 indicates, the check is returned to the customer, with a message requesting an endorsement. The customer provides the endorsement, and returns the check, in block 20. If the endorsement is found, the YES branch is taken from block 45.

Securing the endorsement is an optional procedure. One reason is that, under many state laws, a holder-in-due-course of a negotiable instrument, such as a check, is allowed to supply missing endorsements. Thus, in those states, the presence of an endorsement is not required for the operator of the ATM to obtain payment of the check from the drawee-bank.

The reading operations just described are undertaken by automated apparatus which are commercially available.

In another optional step, block 55 in FIG. 2 indicates that the invention contacts the party issuing the check. For example, if the check is a payroll check, the invention would contact an employer. This contact may be accomplished through sending a message on the INTERNET, such as an e-mail message, or sending a message using a proprietary ATM network.

The message inquires whether the check is genuine. The inquiry can ask the issuing party any of the following questions: whether the party issued a check having the number 120; whether the check having the number 120 was issued in the amount 110; whether the check bearing number 120 was issued to the named payee, and so on.

The party issuing the check would maintain a web site on the INTERNET, or other site for receiving the messages and immediately providing the answers by return message, as indicated by block 60 in FIG. 2. If that party fails to confirm the check, the NO path is taken, and block 65 is reached. The check is returned to the customer, and the transaction terminates.

Another approach to verification does not require contact with the party issuing the check. For example, the essential nature of the check can be viewed from a different perspective. The check is not viewed as a negotiable instrument, but as a message. The message contains information, such as (1) the payee's name, (2) a monetary amount, (3) a drawee bank, and so on.

The sciences of cryptography and cryptanalysis contain highly advanced approaches for authenticating messages. When the check is viewed as a message, the objective of verification becomes transformed into the question: "Was this 'message' actually issued by the party issuing the check ?"

The prior art contains several approaches to answering this question. One approach utilizes "Message Authorization Codes," MACs. A simple example of a MAC will be given.

Certain information on the check shown in FIG. 3, and possibly all the information, takes the form of ASCII characters. If an insufficient number of ASCII characters are found, additional ASCII characters can be added to the check, such as that indicated by character string 60 in FIG. 3. The added characters act as "padding," to increase the size of the message, to improve the security of the MAC.

Each ASCII character has a numerical value. The invention treats each value as a variable, and the variables are treated as inputs to an equation. As a simple example, assume that 50 specific characters are selected from the check, such as those in the payee's name, the bank's name, the legal amount, and the padding. Those characters are either used (1) in some specific order, such as the order just named, or (2) they are arranged into the ascending order of their ASCII values, which is somewhat similar to arranging them in "alphabetical" order.

At this point, 50 variables exist, and will be labeled V1–V50. These variables are inserted into an equation, such as the following:

$$MAC = V1 - V2 + V3 + V4 + \ldots - V50$$

In this particular, simple, equation, each variable is given an algebraic sign, positive or negative, and the algebraic sum, MAC, of the variables is found. This equation is known to the bank issuing the check, and MAC is the Message Authorization Code. The MAC is printed on the check, as indicated by MAC 150 in FIG. 3.

The invention, located at the ATM in FIG. 1, is also in possession of the equation. The invention reads the same variables from the check, inserts them into the same equation, and computes the MAC. If the computed MAC matches the MAC 150 located on the check, then it is concluded that no tampering occurred to the 50 characters read from the check. If no match occurs, the check is rejected.

The preceding steps are represented by block 70 in FIG. 2.

Sources of MAC Algorithms

As stated previously, this explanation is a simplification, given for the purpose of illustration. In the art of cryptography, Message Authorization Codes, MACs, are highly developed, and are described in the text *Applied Cryptography*, by Bruce Schneier (John Wiley & Sons, New York, 1996, ISBN 0 471 12845 7). This text is hereby incorporated by reference, and contains other cryptographic approaches to verifying messages.

Software for implementing MACs is commercially available. One source is Counterpane Systems, 101E. Minnehaha Parkway, Minneapolis, Minn., USA.

In addition, the following publications describe various MAC approaches. These articles are hereby incorporated by reference. ANSI X9.9 (Revised), "American National Standard for Financial Institution Message Authentication (Wholesale)," American Bankers Association, 1986.

ANSI X9.19, American National Standard for Retail Message Authentication," American Bankers Association, 1985.

D. W. Davies, "A Message Authentication Algorithm Suitable for a Mainframe Computer," *Advances in Cryptology: Proceedings of Crypto* 82, Plenum Press, 1983, pp. 89–96.

D. W. Davies and W. L. Price, "The Application of Digital Signatures Based on Public-Key Cryptosystems," *Proceedings of the Fifth International Computer Communications Conference*, October, 1980, pp. 525–530.

D. W. Davies and W. L. Price, "Digital Signature-An Update," *Proceedings of International Conference on Computer Communication, Sydney Oct*.1984, North Holland:Elsevier, 1985, pp. 843–847.

G. Garon and R. Outerbridge, "DES Watch: An Examination of the Sufficiency of the Data Encryption Standard for Financial Institution Information Security in the 1990's," *Cryptologia*, v. 15, n. 3, July, 1991, pp. 177–193.

M. Girault, "Hash-Functions Using Modulo-N Operations," *Advances in Cryptology-EUROCRYPT '87 Proceedings*, Springer-Verlag, 1988, pp. 217–226.

ISO DIS 8731-1, "Banking-Approved Algorithms for Message Authentication—Part 1: DEA," Association for Payment Clearing Services, London, 1987.

ISO DIS 8731-2, "Banking-Approved Algorithms for Message Authentication—Part 2: Message Authenticator Algorithm," Association for Payment Clearing Services, London, 1987.

ISO/IEC 9797, "Data Cryptographic Techniques—Data Integrity Mechanism Using a Cryptographic Check Function Employing a Block Cipher Algorithm," International Organization for Standardization, 1989.

ISO DIS 10118 DRAFT, "Information Technology-Security Techniques-Hash Functions," International Organization for Standardization, 1989.

ISO DIS 10118 DRAFT, "Information Technology-Security Techniques-Hash Functions," International Organization for Standardization, April 1991.

R. R. Jueneman, "Analysis of Certain Aspects of Output-Feedback Mode," *Advances in Cryptology: Proceedings of Crypto* 82, Plenum Press, 1983, pp. 99–127.

R. R. Jueneman, "Electronic Document Authentication," *IEEE Network Magazine*, v. 1, n. 2, Apr. 1978, pp. 17–23.

R. R. Jueneman, "A High Speed Manipulation Detection Code," *Advances in Cryptology—CRYPTO '86 Proceedings*, Springer-Verlag, 1987, pp. 327–346.

R. R. Jueneman, S. M. Matyas, and C. H. Meyer, "Message Authentication with Manipulation Detection Codes," *Proceedings of the* 1983 *IEEE Computer Society Symposium on Research in Security and Privacy*, 1983, pp. 733–54.

R. R. Jueneman, S. M. Matyas, and C. H. Meyer, "Message Authentication," *IEEE Communications Magazine*, v. 23, n. 9, Sep. 1985, pp. 29–40.

X. Lai, R. A. Rueppel, and J. Woollven, "A Fast Cryptographic Checksum Algorithm Based on Stream Ciphers," *Advances in Cryptology—AUSCRYPT '92 Proceedings*, Springer-Verlag, 1993, pp. 339–348.

J. Linn, "Privacy Enhancement for Internet Electronic Mail: Part I—Message Enciphering and Authentication Procedures," RFC 1040, Jan., 1988.

K. Ohta and M. Matsui, "Differential Attack on Message Authentication Codes," *Advances in Cryptology—CRYPTO '93 Proceedings*, Springer-Verlag, 1994. pp. 200–223.

Open Shop Information Services, *OSIS Security Aspects*, OSIS European Working Group, WGI, final report, Oct., 1985.

B. Preneel, "Analysis and Design of Cryptographic Hash Functions," Ph.D. dissertation, Katholieke Universiteit Leuven, Jan., 1993.

Research and Development in Advanced Communication Technologies in Europe, *RIPE Integrity Primitives: Final Report of RACE Integrity Primitives Evaluation*, (R1040), RACE, June, 1992.

Standards Association of Australia, "Australian Standard 2805.4 1985: Electronic Funds Transfer—Requirements for Interfaces: Part 4—Message Authentication," SAA, North Sydney, NSW, 1985.

R. Taylor, "An Integrity Check Value Algorithm for Stream Ciphers," *Advances in Cryptology—CRYPTO '93 Proceedings*, Springer-Verlag, 1994, pp. 40–48.

G. Tsudik, "Message Authentication with One-Way Hash Functions," *ACM Computer Communications Review*, v. 22, n. 5, 1992, pp. 29–38.

Other Verification Steps

The owner of the check may have photocopied the check, and may attempt to cash it twice. Several approaches exist to prevent this event.

One is to generate a record of each check-cashing event, by generating a list of all checks cashed, to prevent a check from being cashed twice. Whenever the ATM cashes a check, the ATM records all relevant data from the check, such as the amount, check number, drawee-bank's identity, payee name, and so on. Block 100 in FIG. 2 indicates these steps, and is placed at the end of the flow chart, because its actions are undertaken after the currency is delivered to the customer.

The ATM places this information into a list maintained at a central location, such as a web site, for use by itself and other ATMs. Only ATMs, or other authorized parties, are allowed to modify the web sites. Whenever a check is to be cashed, the ATM cashing the check examines the central location, as indicated by block 75, to ascertain whether the check is contained on the list, which would indicate that the check was cashed previously.

A second approach is to require that the checks be printed upon a medium which is difficult to replicate. For example, it may be required that the paper contain metallic threads, in a specific configuration. The paper may be required to possess a specific watermark. The paper may be required to possess specific electrical characteristics, such as specific, measurable resistances between specific points. The wires mentioned earlier may contribute to these characteristics. Numerous automated approaches exist for authenticating papers and bills. Block 80 indicates the paper-authentication step.

A third approach is to equip the person cashing the check with a "smart" card. Smart cards are known in the art. An important feature of the smart card is that (1) it contains a large amount of memory, such as 10 kilobytes (kB), 100 kB, 1,000 kB, or more, and (2) the memory can be read, and written, by apparatus contained within the ATM. This memory replaces the list just discussed.

Whenever a person cashes a check, the ATM writes data identifying the check into this memory. Card C in FIG. 1 represents the smart card. Block 180 represents the memory, and blocks 185 represent the identities of the checks already cashed.

During a current check-cashing transaction, the invention examines blocks 185, as indicated by block 75 in FIG. 2, to ascertain whether the currently presented check is listed. If so, the invention refuses to cash the check.

Blocks 110 may be encrypted, to hinder attempts by the customer to remove a check from memory.

The Inventor points out that a given customer may copy a check, and give the copy to an accomplice. If the customer cashes the check, that cashing event will be recorded in the memory 180 in FIG. 1 of the customer's card C, but not in the memory of the accomplice's card (not shown). However, the copy of the check will name the customer as payee, not the accomplice. The accomplice's card will name the accomplice. This mis-match will prevent the copy from being cashed.

Verification of the Person

Block 85 in FIG. 2 indicates that the identity of the customer cashing the check is verified. Numerous approaches, using biometric parameters, are available. For example, U.S. Pat. No. 5,893,057 identifies a person based on voice. U.S. Pat. No. 5,291,560 utilizes the iris of the eye. U.S. Pat. No. 4,393,366 utilizes the retina of the eye. U.S. Pat. No. 5,815,252 utilizes the fingerprint. The preceding patents are hereby incorporated by reference.

Alternately, the person may be required to use smart card C in FIG. 1, to log into the ATM. That smart card may carry a multitude of biographical data about the person, such as date of birth, date of marriage, number of children, name of grammar school attended, and so on. The invention, as indicated by block 85 in FIG. 2, selects a random set of these data in the verification step, and asks the person several questions, such as "What is your data of birth ? Where did you attend grammar school ? What is your e-mail address ?" If the person fails to answer the questions, the transaction terminates.

In addition, the smart card C may carry data used in a "signature verification" process. The Schneier text, identified above, provides examples of signature verification. This type of verification ascertains the identity of the customer.

After both the check and the customer have been verified, the invention delivers the appropriate currency to the customer, and stores the check in a storage bin. Significantly, no deduction is made to an account maintained by the person, because, in general, the check will not be drawn on such an account, but on an account maintained by another party, namely, that of the second party.

Additional Considerations

1. The invention above has been framed in terms of an ATM. However, an ATM is not required. A self-service station, or kiosk generally, will suffice.

2. The MAC, and techniques using similar codes, perform a specific function. They indicate whether certain symbols carried by the check have been altered since their generation, or issuance. That is, when the issuer of the check (1) applies the symbols contained on the check to the equation, (2) computes the MAC, and (3) prints the MAC on the check, the issuer, in effect, provides a means for a party in possession of the identical equation to determine whether the symbols are subsequently altered.

If someone alters even one symbol, then, when the altered symbols are fed to the equation, an incorrect MAC will be produced, thereby indicating the alteration. Conversely, if no alteration occurs, the correct MAC will be produced, thereby indicating that the symbols presently contained on the check were those present when the check was issued.

3. It is recognized that the ATM may impose a service fee for cashing the check. Further, this fee may be deducted from the amount of currency delivered to the customer.

In addition, most ATMs deal exclusively in paper currency. Coins are not delivered. Consequently, the ATM may round all currency amounts, and deliver currency based on the rounded amount. For example, the sum $92.50 may be rounded down to $92.00. The ATM may retain the excess as part of the service fee, or may issue a voucher which the owner of the ATM, such as a bank, will honor, by purchasing the voucher for its face value.

The ATM may display, after log-in by the customer, a list of the fees which will be imposed for various transactions.

4. The preceding discussion has been framed in terms of issuance of cash to the customer. However, other items of value can be dispensed, in return for the deposited check. Without limitation, these items can include goods and services generally, telephone service, tickets for gaining admission to public and private events, vouchers such as food stamps, and other types of documents.

Numerous substitutions and modifications can be undertaken without departing from the true spirit and scope of the invention. What is desired to be secured by Letters Patent is the invention as defined in the following claims.

What is claimed is:

1. In an ATM, the improvement comprising:
   a) means for accepting a bank check from a customer; and
   b) means for delivering
      i) currency to the customer, without causing modification of an account maintained by the customer;
      ii) one or more documents having monetary value; and
   c) means for utilizing Message Authorization Codes, MACs, to verify authenticity of the bank check.

2. A method of operating an ATM which delivers currency to customers, comprising the following steps:
   a) receiving a check from any customer;
   b) verifying validity of-the check and the identity of the customer and, if both are valid, delivering currency to the customer, without causing alteration of an account maintained by the customer; and
   c) utilizing one or more Message Authorization Codes, MACs, to verify authenticity of the check.

* * * * *